United States Patent
Hattori et al.

(10) Patent No.: US 6,944,255 B2
(45) Date of Patent: Sep. 13, 2005

(54) NUCLEAR REACTOR

(75) Inventors: Sadao Hattori, Tokyo (JP); Masaki Uotani, Tokyo (JP); Nobuyuki Ueda, Tokyo (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 10/483,197

(22) PCT Filed: Jul. 10, 2002

(86) PCT No.: PCT/JP02/06997

§ 371 (c)(1),
(2), (4) Date: Jan. 8, 2004

(87) PCT Pub. No.: WO03/007310

PCT Pub. Date: Jan. 23, 2003

(65) Prior Publication Data

US 2004/0247067 A1 Dec. 9, 2004

(30) Foreign Application Priority Data

Jul. 10, 2001 (JP) ........................ 2001-209939

(51) Int. Cl.[7] .............................................. G21C 15/00
(52) U.S. Cl. ...................... 376/405; 376/298; 376/402
(58) Field of Search .............................. 376/402–406, 376/298, 299

(56) References Cited

U.S. PATENT DOCUMENTS

| | | | | |
|---|---|---|---|---|
| 2,748,710 A | * | 6/1956 | Vandenberg | 103/1 |
| 3,151,034 A | * | 9/1964 | Royal, Jr. et al. | 176/53 |
| 3,190,808 A | * | 6/1965 | Dodd | 176/65 |
| 3,290,222 A | * | 12/1966 | Schoessow et al. | 176/37 |
| 3,312,596 A | * | 4/1967 | Grain | 176/54 |
| 4,033,814 A | * | 7/1977 | Bregeon et al. | 176/63 |
| 4,045,286 A | * | 8/1977 | Blum et al. | 176/49 |
| 4,056,439 A | * | 11/1977 | Robin | 176/65 |
| 4,294,658 A | * | 10/1981 | Humphreys et al. | 376/404 |
| 4,645,633 A | * | 2/1987 | Hattori | 376/404 |
| 4,753,576 A | * | 6/1988 | Slepian | 376/404 |
| 5,045,274 A | * | 9/1991 | Donaldson | 376/318 |
| 5,229,067 A | * | 7/1993 | Hammers | 376/406 |
| 5,263,070 A | * | 11/1993 | Kumaoka | 376/406 |
| 6,269,873 B1 | * | 8/2001 | Gautier et al. | 165/275 |

FOREIGN PATENT DOCUMENTS

| | | | |
|---|---|---|---|
| JP | 55-52992 A | | 4/1980 |
| JP | 58-187894 A | | 2/1983 |
| JP | 6071992 | * | 4/1985 |
| JP | 62127699 | * | 6/1987 |
| JP | 62226089 | * | 10/1987 |
| JP | 62267690 | * | 11/1987 |
| JP | 62272187 | * | 11/1987 |
| JP | 62278485 | * | 12/1987 |
| JP | 63-101795 A | | 5/1988 |
| JP | 63120287 | * | 5/1988 |
| JP | 63-121785 A | | 5/1988 |
| JP | 2-307096 A | | 12/1990 |
| JP | 4-110694 A | | 4/1992 |
| JP | 7-7917 A | | 1/1995 |
| JP | 7-7918 A | | 1/1995 |

* cited by examiner

Primary Examiner—Harvey E. Behrend
(74) Attorney, Agent, or Firm—Notaro & Michalos PC

(57) ABSTRACT

A nuclear reactor in which a secondary or tertiary coolant system of a nuclear steam supply system is simplified, comprising: a reactor vessel (2) which integrates a reactor core (1); a first coolant (3) which is stored in the reactor vessel (2) and heated by the reactor core (1) to convect; a first heat transfer tube (4) which is arranged in the reactor vessel (2) and comes into contact with the first coolant (3); and a second coolant (5) which is supplied from the outside of the reactor vessel (2) to the first heat transfer tube (4), cools the first coolant (3) and led to the outside of the reactor vessel (2).

5 Claims, 3 Drawing Sheets

NUCLEAR REACTOR

TECHNICAL FIELD

The present invention relates to a nuclear reactor. More particularly, the present invention relates to a nuclear reactor in which a cooling system is divided into at least a primary system and a secondary system.

BACKGROUND ART

In a nuclear reactor of an indirect cycle which generates electric power by rotating a turbine with steam which is not contaminated by radiation, a steam generator or a heat exchanger is provided between the primary coolant system and the secondary coolant system.

For example, in a loop-type fast breeder, heat of a primary sodium system (primary coolant system) heated by cooling a reactor core is transmitted to a secondary sodium system (secondary coolant system) by an intermediate heat exchanger, and heat of the secondary sodium system is transmitted to a water/steam system by an evaporator and a superheater. Further, in a pool-type fast breeder reactor in which a reactor vessel is increased in size and a pump of a primary sodium system and an intermediate heat exchanger are integrated in the reactor vessel, likewise, heat of the primary sodium system is transmitted to the secondary sodium system by the intermediate heat exchanger, and heat of the secondary sodium system is transmitted to a water/steam system by a steam generator.

Furthermore, in a nuclear reactor other than the fast breeder, e.g., a pressurized light water reactor, heat of a primary cooling water heated by cooling a reactor core is transmitted to a water/steam system by a steam generator.

In the above-described nuclear reactor of the indirect cycle, however, since transmission of heat between the respective cooling systems is carried out by the steam generator or the heat exchanger which is independent or integrated in each chamber and connected through a pipe, the entire cooling system becomes complicated and large. In particular, in the fast breeder or the like aiming at power generation, the primary coolant system is constituted by many loops, and a plurality of loops of the secondary coolant system are connected to each of the loops of the primary coolant system. Therefore, the number of pipes, pumps, heat exchangers or steam generators and others is increased, and complication or an increase in size of the cooling system is prominent. Therefore, a manufacturing cost of a nuclear steam supply system (HSSS: including the nuclear reactor, the secondary and subsequent cooling systems, the heat exchanger and the steam generator) reaches a huge value, and its maintenance management requires many work forces and monitoring facilities, and hence a large amount of cost is needed.

It is to be noted that the pipes or the like of the cooling systems are reduced in the pool-type fast breeder reactor as compared with the loop-type fast breeder, thereby achieving simplification or a reduction in size of the cooling systems as compared with the loop-type fast breeder. However, the intermediate heat exchanger or the steam generator is still required, it cannot be said that simplification or a reduction in size of the cooling systems is sufficient, and further simplification or a reduction in size of the cooling systems is demanded.

DISCLOSURE OF INVENTION

It is an object of the present invention to provide a nuclear reactor in which a cooling system is simplified and which is suitable for a reduction in size of a nuclear steam supply system.

To achieve this aim, according to the present invention, there is provided a nuclear reactor comprising: a reactor vessel which integrates therein a reactor core; a first coolant which is stored in the reactor vessel and heated by the reactor core to convect; a first heat transfer tube which is arranged in the reactor vessel and comes into contact with the first coolant; and a second coolant which is supplied from the outside of the reactor vessel to the first heat transfer tube, cools the first coolant and led to the outside of the reactor vessel, thereby transferring heat from the first coolant to the second coolant through the first heat transfer tube arranged in the reactor vessel.

Therefore, the reactor core is cooled by the first coolant which convects in the reactor vessel, and the first coolant is cooled by the second coolant which flows through the first heat transfer tube and is led into the reactor vessel. Further, the second coolant heated flowing through the first heat transfer tube is led to the outside of the reactor vessel, and heat of the reactor core can be exploited outside the reactor vessel without using an intermediate heat exchanger or a steam generator.

Based on this, the cooling system outside the reactor vessel can be simplified, and a nuclear steam supply system and a reactor containment can be reduced in size, thereby decreasing a facility cost. Furthermore, since the cooling system can be simplified, monitoring targets can be reduced, maintenance management of the nuclear steam supply system can be simplified in terms of both personnel and facilities, thus reducing their costs. Moreover, since the small nuclear steam supply system can be inexpensively manufactured, a use of the nuclear reactor as a dispersion-type power source can be facilitated.

Additionally, in the nuclear reactor according to the present invention, it is preferable that the first coolant is a primary coolant and the second coolant is a fluid of a water/steam system which is supplied from the outside of the reactor vessel to the first heat transfer tube, cools the primary coolant and led to the outside of the reactor vessel. In this case, heat of the reactor core is cooled by the primary coolant which convects in the reactor vessel, steam is provided by heating the fluid of the water/steam system led from the outside of the reactor vessel through the first heat transfer tube and it is utilized as a use of heat outside the reactor vessel, e.g., drive of a power generation turbine.

In this nuclear reactor, since the heat transfer tube is arranged in the reactor vessel and heat of the primary coolant is transmitted to the fluid of the water/steam system in the reactor vessel, an intermediate heat exchanger and a steam generator independent from the reactor vessel are no longer necessary, thereby simplifying the cooling system. Therefore, the nuclear reactor in which the cooling system is constituted of the primary coolant system and the secondary coolant system can be reduced in size. Accordingly, the small nuclear reactor which is suitable for a dispersion-type power source can be inexpensively manufactured, thereby facilitating a use of the nuclear reactor.

Further, in the nuclear reactor according to the present invention, the reactor vessel is constituted of an inner vessel of a double vessel, the first coolant is determined as the primary coolant, and the second coolant is determined as a secondary coolant stored between an outer vessel and the inner vessel of the double vessel, the nuclear reactor including: a second heat transfer tube which is arranged between the outer vessel and the inner vessel and comes into contact with the secondary coolant; and a fluid of a tertiary coolant system which is supplied from the outside of the double vessel to the second heat transfer tube, cools the secondary coolant and led to the outside of the double vessel. Here, it is preferable that the fluid of the tertiary coolant system is a fluid of a water/steam system which is suitable for rotating a power generation turbine.

In this case, the primary coolant convects in the inner vessel of the double vessel, and transfers heat of the reactor core to the secondary coolant through the first heat transfer tube. Then, heat of the secondary coolant is transmitted to the fluid of the tertiary coolant system through the second heat transfer tube. At the same time, heat transfer is also performed from the primary coolant to the secondary coolant through a wall surface of the inner vessel. The fluid of the tertiary coolant system flows into the second heat transfer tube in a liquid state, receives heat from the secondary coolant, and enables heat of the reactor core to be exploited outside the double vessel.

In this nuclear reactor, heat transfer from the primary coolant to the secondary coolant is carried out through the first heat transfer tube arranged in the inner vessel, and heat transfer from the secondary coolant to the tertiary coolant is performed through the second heat transfer tube arranged between the inner vessel and the outer vessel. Therefore, heat of the reactor core can be safely exploited outside the double vessel (reactor vessel) without using an intermediate heat exchanger and a steam generator independent from the reactor vessel, and a structure that the primary coolant system and the secondary coolant system are integrated in the double vessel is adopted, thereby greatly reducing the number of tubes and the like. Thus, the cooling system is simplified, and the nuclear steam supply system including the three systems, i.e., the primary coolant system, the secondary coolant system and the tertiary coolant system and the reactor containment can be reduced in size, thereby decreasing a facility cost. Furthermore, since the cooling system can be simplified, the maintenance management of the nuclear steam supply system becomes simple, thus reducing its cost. Moreover, since the small nuclear steam supply system can be inexpensively manufactured, a use of the nuclear reactor as a dispersion-type power source can be facilitated.

Additionally, in the nuclear reactor according to the present invention, the primary coolant and the secondary coolant are determined to be conductors, and the nuclear reactor includes magnetic flux generating means for generating a magnetic flux which pierces the first heat transfer tube in a radial direction of the double vessel.

In this case, a force to facilitate a convection of the primary coolant can be generated by using an electromotive force generated by a flow of the secondary coolant in the first heat transfer tube. For example, when the secondary coolant flows upwards through the first heat transfer tube, there is generated an electromotive force in a movement direction of the secondary coolant which is a conductor and a direction perpendicular to a direction of the magnetic flux, i.e., a circumferential direction of the double vessel, based on the Flemming's right-hand rule. A current is generated in the primary coolant in the inner vessel by this electromotive force. A magnetic field of the magnetic flux generating means is also produced in the primary coolant around the first heat transfer tube, and a force in a direction perpendicular to a direction of the magnetic field and a direction of the current in the primary coolant, i.e., a downward direction is generated based on the Flemming's left-hand rule. That is, the downward force acts on the primary coolant around the first heat transfer tube. Since the primary coolant is cooled and convects downwards by the secondary coolant flowing through the first heat transfer tube around the first heat transfer tube, a force in a direction which is the same as a direction of this convection acts on the primary coolant. Therefore, a flow quantity of the primary coolant can be increased and a cooling capability of the reactor core can be improved by utilizing a flow of the secondary coolant. Incidentally, as the conductors which are the primary coolant and the secondary coolant, there are, e.g., liquid sodium and liquid metal such as a liquid lead-bismuth eutectic, liquid potassium and others. Among them, a use of liquid sodium enables an application to a fast breeder. That is, even if a fluid of a water/steam system is used as the fluid of the tertiary coolant system, a contact between water and liquid sodium is restricted to a position between the inner vessel and the outer vessel, and sodium explosion does not affect the reactor core side.

Here, it is preferable that the first heat transfer tube is an erected straight tube. In this case, a movement of the second coolant in the first heat transfer tube, e.g., an upward movement is most efficiently converted into a force to facilitate the convection of the first coolant, e.g., a downward force, thereby provoking a stronger circulation. Further, it is preferable to forcibly circulate the secondary coolant by providing a pump at an inlet part of the first heat transfer tube. In this case, heat transfer from the secondary coolant to the tertiary coolant is increased as a flow quantity of the secondary coolant which circulates in the first heat transfer tube becomes large and, at the same time, a force to facilitate the convection of the primary coolant formed by the magnetic flux generating means is also increased and a circulation quantity of the primary coolant becomes higher. Furthermore, heat transfer from the primary coolant system to the secondary coolant system is increased, and hence the entire cooling efficiency is increased.

BEST MODE FOR CARRYING OUT OF THE INVENTION

A structure of the present invention will now be described in detail hereinafter based on the best mode shown in the accompanying drawings.

Figure 1:
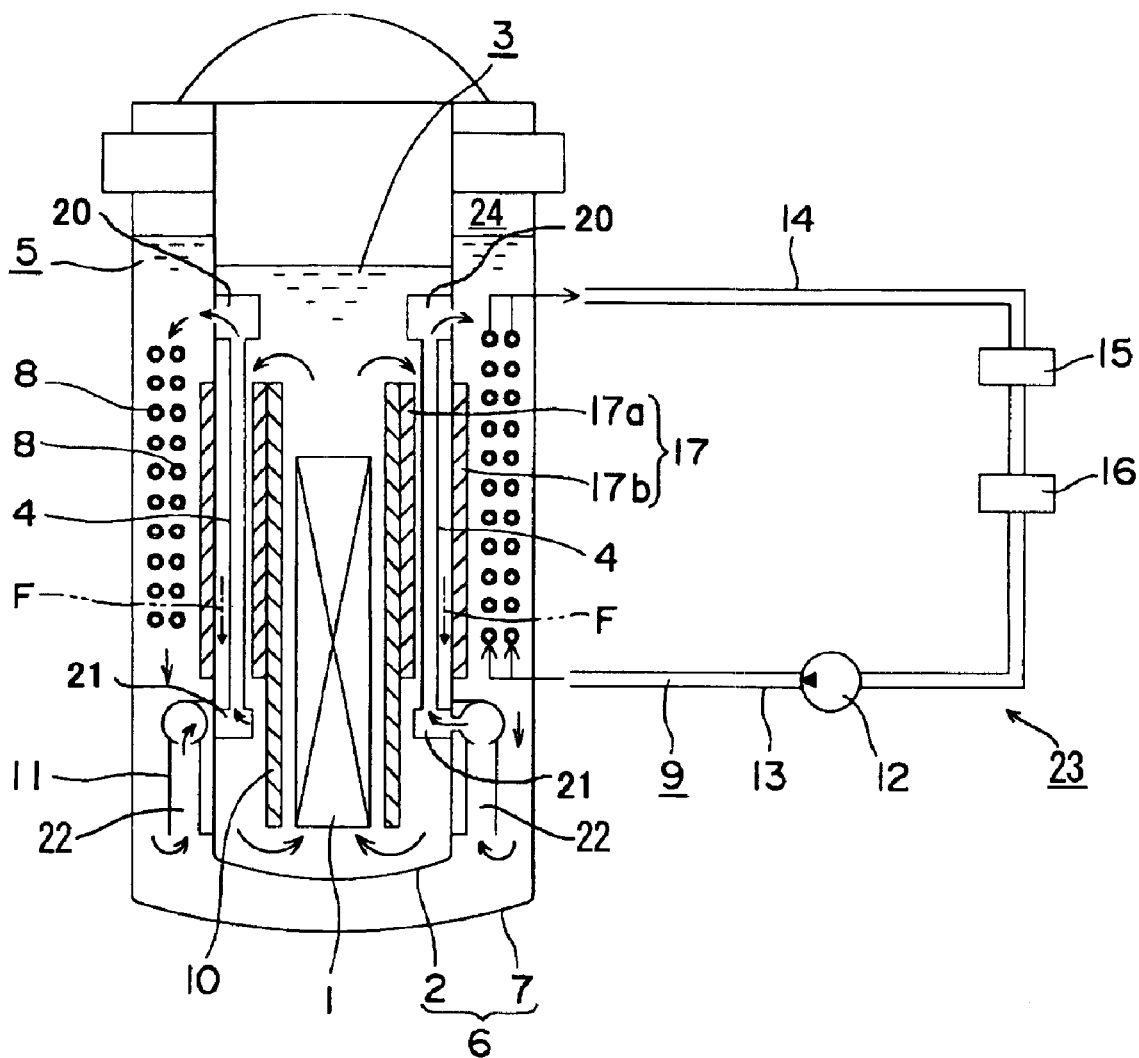
FIG. 1 is a schematic block diagram conceptually showing an embodiment of a nuclear reactor according to the present invention.

FIG. 1 shows a first embodiment of a nuclear reactor according to the present invention. This nuclear reactor includes: a reactor vessel 2 which integrates therein a reactor core 1; a first coolant 3 which is stored in the reactor vessel 2, and heated by the reactor core 1 to convect; a first heat transfer tube 4 which is arranged in the reactor vessel 2 and comes into contact with the first coolant 3; and a second coolant 5 which is supplied from the outside of the reactor vessel 2 to the first heat transfer tube 4, cools the first coolant 3 and led to the outside of the reactor vessel 2. The reactor vessel 2 is an inner vessel of a double vessel 6 (which will be referred to as an inner vessel 2 in this embodiment), the first coolant 3 is a primary coolant (which will be referred to as a primary coolant 3), and the second coolant 5 is a secondary coolant (which will be referred to as a secondary coolant 5 in this embodiment) which is stored between an outer vessel 7 and the inner vessel 2 of the double vessel 6, the nuclear reactor including: a second heat transfer tube 8 which is arranged between the outer vessel 7 and the inner vessel 2 and comes into contact with the secondary coolant 5; and a fluid 9 of a water/steam system 23 as a tertiary coolant system, which is supplied from the outside of the double vessel 6 to the second heat transfer tube 8, cools the secondary coolant 5 between the inner vessel 2 and the outer vessel 7 and led to the outside of the double vessel 6. That is, the cooling system of this nuclear reactor is constituted of the primary coolant system, the secondary coolant system and the water/steam system 23.

The primary coolant 3 of the primary coolant system and the secondary coolant 5 of the secondary coolant system are, e.g., conductors. In this embodiment, as conductors, liquid metal is used, for example. Moreover, as the conductor, liquid sodium is used, for example. However, the primary coolant 3 and the secondary coolant 5 are not restricted to liquid sodium, and liquid metal such as a liquid lead-bismuth eutectic or liquid potassium can be adopted.

The first heat transfer tube 4 is arranged in the primary coolant 3 or, preferably, in the vicinity of an inner wall surface of the inner vessel 2, e.g., the outside of a shield 10 surrounding the reactor core 1. The first heat transfer tube 4 is constituted of many tubes connected to each other through an upper header 20 and a lower header 21, and they are aligned in a concentric circle form with the inner vessel 2, for example. In this embodiment, the first heat transfer tube 4 is constituted of a straight tube which is erected in a perpendicular direction, and the respective first heat transfer tubes 4 are arranged in a circular form at fixed intervals therebetween with a given gap with an inner wall surface of the inner vessel 2 along the inner wall surface. The upper header 20 of the first heat transfer tube 4 is opened to the outside of the inner vessel 2, and caused to communicate with a space between the outer vessel 7 and the inner vessel 2. Moreover, the lower header 21 of the first heat transfer tube 4 is connected to an annular body 11 attached on an outer peripheral surface of the inner vessel 2, and caused to communicate with a space between the inner vessel 2 and the outer vessel 7, i.e., a flow path of the secondary coolant 5 through a downward opening portion of the annular body 11. An inlet 22 is formed on the bottom of the annular body 11.

The second heat transfer tube 8 has, e.g., a coil-like shape. In this embodiment, the second heat transfer tube 8 is constituted of a double coil. A water/steam system outside the outer vessel 7 is connected to the second heat transfer tube 8. That is, the fluid 9 of the water/steam system circulates from a pump 12 to a water supply tube 13, the second heat transfer tube 8, a steam piping 14, a power generation turbine 15, a condenser 16 and the pump 12 in the mentioned order.

Figure 2:
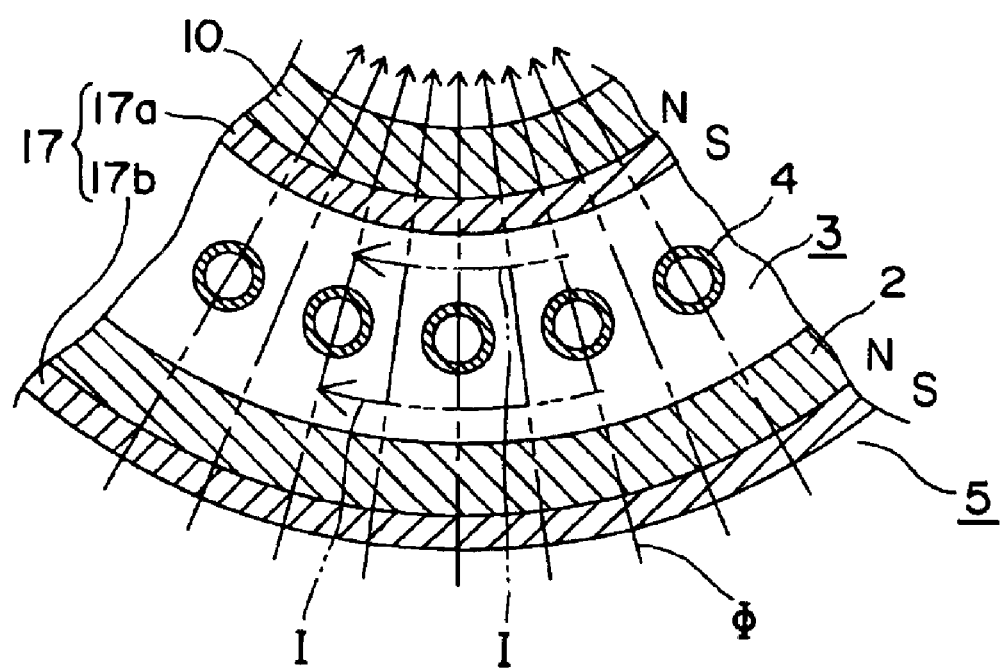
FIG. 2 is a cross-sectional view showing magnetic flux generating means of the same nuclear reactor.

This nuclear reactor includes magnetic flux generating means 17 for generating a magnetic flux which pierces the first heat transfer tube 4 in a radial direction of the double vessel 6, and generates a force to facilitate a convection of the primary coolant 3 by using an electromotive force produced by a flow of the secondary coolant 5 in the first heat transfer tube 4. The magnetic flux generating means 17 is constituted of, e.g., a pair of cylindrical permanent magnets 17a and 17b as shown in FIG. 2. The permanent magnets 17a and 17b are arranged on the inner side and the outer side of the first heat transfer tube 4 with the first heat transfer tube 4 therebetween. Specifically, the inner permanent magnet 17a is attached on the outer peripheral surface of the shield 10, and the outer permanent magnet 17b is attached on the outer peripheral surface of the inner vessel 2. The inner side of each of the cylindrical permanent magnets 17a and 17b is magnetized to the north pole, and the outer side of the same is magnetized to the south pole. It is to be noted that reference characters N and S in FIG. 2 denote the magnetic poles of the permanent magnets 17a and 17b. The pair of permanent magnets 17a and 17b generate a magnetic flux $\Phi$ which pierces the first heat transfer tube 4 and is directed from the outer side of the double vessel 6 in the radial direction toward the inner side of the same. It is to be noted that the outer cylindrical permanent magnet 17b is attached on the outer peripheral surface of the inner vessel 2 so as not to narrow a space in the reactor vessel in this embodiment, but it may be attached on the inner peripheral surface of the inner vessel 2 and the pair of permanent magnets 17a and 17b may be arranged so as to be directly opposed to each other with the first heat transfer tube 4 therebetween. In this case, it is desirable to assure a sufficient space through which the primary coolant 3 flows downwards between the permanent magnets 17a and 17b.

When the liquid sodium which is the secondary coolant 5 flows upwards through the first heat transfer tube 4 by a natural convection, there is generated an electromotive force in a direction perpendicular to a movement direction of the secondary coolant 15 as a conductor and a direction of the magnetic flux $\Phi$, i.e., a circumferential direction indicated by an arrow I in FIG. 2, based on the Flemming's right-hand rule. The liquid sodium is a conductor, and a current in the direction indicated by the arrow I is produced in the primary coolant 3 by the generated electromotive force.

On the other hand, the magnetic flux $\Phi$ formed by the magnetic flux generating means 17 is also generated in the primary coolant 3 around the first heat transfer tube 4, and a force F in a direction perpendicular to a direction of a magnetic field and a direction of the current in the primary coolant 3, i.e., a downward direction is generated based on the Flemming's left-hand rule. Since the primary coolant 3 is cooled down and convects downwards around the first heat transfer tubes 4 as described later, the force F in the same direction as the direction of this convection acts on the primary coolant 3, and a flow of the primary coolant 3 is accelerated.

The primary coolant 3 of the primary coolant system is heated by cooling the reactor core 1, and cooled by heating the secondary coolant 5 flowing through the first heat transfer tube 4. Therefore, the primary coolant 3 convects in the inner vessel 2, and transfers heat of the reactor core 1 to the secondary coolant 5 through the first heat transfer tube 4.

The secondary coolant 5 of the secondary coolant system is heated by the primary coolant 3 in the first heat transfer tube 4, and cooled by heating the fluid 9 of the water/steam system flowing through the second heat transfer tube 8. Therefore, the secondary coolant 5 moves up in the first heat transfer tube 4 by the convection, and moves down between the inner vessel 2 and the outer vessel 7. That is, the secondary coolant 5 circulates from the annular body 11 to the first heat transfer tube 4, the space between the inner vessel 2 and the outer vessel 7 and the annular body 11 in the mentioned order, and transfers heat received from the primary coolant 3 to the fluid 9 of the water/steam system through the second heat transfer tube 8. It is to be noted that a cover gas 24 is provided on the secondary coolant 5 stored between the inner vessel 2 and the outer vessel 7.

The fluid 9 of the water/steam system flows into each second heat transfer tube 8 from its lower end in the state of water, and is turned to steam by receiving heat from the secondary coolant 5 while moving up through the second heat transfer tube 8, and the steam is supplied to the power generation turbine 15 through a steam piping 14. Then, after driving the power generation turbine 15, the steam is again turned to the state of water by a condenser 16, and again supplied into the second heat transfer tube 8 by a pump 12.

In this manner, heat transfer from the primary coolant 3 to the secondary coolant 5 is carried out through the first heat transfer tube 4 arranged in the inner vessel 2. Furthermore, heat transfer from the secondary coolant 5 to the fluid 9 of the water/steam system is effected by the second heat transfer tube 8 arranged between the inner vessel 2 and the outer vessel 7. Therefore, in this nuclear reactor, heat transfer can be carried out without using an intermediate heat exchanger and a steam generator which are required in a conventional nuclear reactor. It is to be noted that heat transfer can be likewise performed between the primary coolant 3 and the secondary coolant 5 which is provided between the inner vessel 2 and the outer vessel 7 through the wall surface of the inner vessel 2.

Moreover, in this nuclear reactor, since the intermediate heat exchanger and the steam generator are not used and the primary coolant system and the secondary coolant system are integrated in the double vessel 6, tubes and the like of the primary coolant system and the secondary coolant system can be greatly reduced. Therefore, the cooling system can be simplified and reduced in size. That is, the nuclear reactor can be reduced in size in the broad sense including the cooling system, and a manufacturing cost can be decreased. Additionally, since the cooling system can be simplified, the maintenance management of the nuclear reactor becomes easy, and its cost can be also reduced. Further, since the small nuclear reactor can be inexpensively manufactured, a use of the nuclear reactor as a dispersion-type power source can be facilitated.

Since heat transfer using the heat transfer tube is an already established technique with high reliability, it is suitable for a use in the nuclear reactor requiring high safety.

This nuclear reactor is very suitable for an application to, e.g., a small nuclear reactor whose electrical output is approximately 5000 kW, a small nuclear reactor whose electrical output is approximately 10000 kW and the like. In the small nuclear reactor with this degree of electrical output, a calorific power of the reactor core 1 is relatively small, and the reactor core 1 can be sufficiently cooled by circulation based on the natural convection of the primary coolant 3 and the secondary coolant 5. Furthermore, heat transfer using the heat transfer tubes 4 and 8 is sufficiently possible. Of course, it can be applied to a large nuclear reactor by appropriately performing designing.

Moreover, in the nuclear reactor according to this embodiment, liquid sodium is used as the secondary coolant 5, and the second heat transfer tube 8 of the water/steam system is arranged in this liquid sodium. Therefore, it can be considered that water leaks from the second heat transfer tube 8 and comes into contact with the surrounding liquid sodium 5. It is known that this liquid sodium intensively reacts with water. However, assuming that a part of the second heat transfer tube 8 is damaged, water leaks from the second heat transfer tube 8 and intensively reacts with the liquid sodium, since the primary coolant 3 and the secondary coolant 5 are separated from each other by the shell wall of the inner vessel 2 and the first heat transfer tube 4, a reaction product does not flow into the reactor core 1. Additionally, since an increase in pressure resulting from the reaction is suppressed by the damping effect of the cover gas 24, the shell wall is not damaged.

Further, even if the second heat transfer tube 8 is damaged, all of water in the second heat transfer tube 8 does not react with sodium at a time, but reaction between water and sodium is performed in the deconcentrated manner. That is, water which has leaked due to a crack generated to the second heat transfer tube 8 reacts with sodium, and its impact advances the crack or generates a new crack. As a result, water further leaks and reacts with sodium, and its impact further advances the crack or generates a new crack. That is, the relatively small impact is repeatedly produced. Therefore, a large impact is not generated at a time, and the impact is absorbed by the damping effect of the cover gas 24. Therefore, the inner vessel 2 is not damaged. Furthermore, since the nuclear reactor is so configured that the liquid sodium 5 around the second heat transfer tube 8 transfers/receives heat through the primary coolant 3 in the inner vessel 2 and the first heat transfer tube 4, it is not contaminated, and there is no risk of radioactive contamination even if it flows to the outside due to a damage to the outer vessel 7. That is, although the nuclear reactor according to this embodiment has a possibility that the liquid sodium comes into contact with water, the reactor core 1 is structurally safe.

Figure 3:
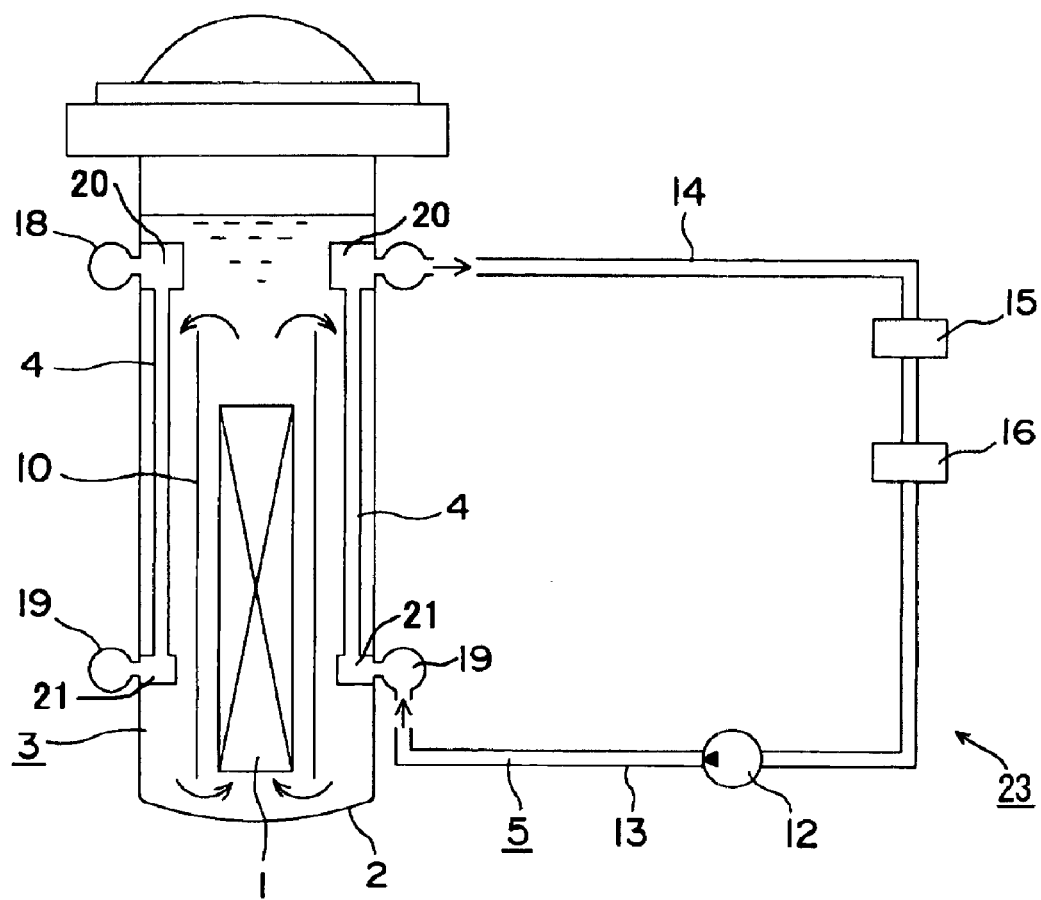
FIG. 3 is a schematic block diagram conceptually showing another embodiment of the nuclear reactor according to the present invention.

A second embodiment of the nuclear reactor according to the present invention will now be described with reference to FIG. 3. It is to be noted that like reference numerals denote the same constituent elements as those in the nuclear reactor shown in FIG. 1.

A cooling system of this nuclear reactor is constituted of a primary coolant system and a water/steam system 23 which flows through heat transfer tubes 4 running in a reactor vessel 2 and removes heat of a primary coolant. That is, the nuclear reactor includes: a reactor vessel 2 which integrates therein a reactor core 1; a first coolant 3 which is stored in the reactor vessel 2, heated by the reactor core 1 to convect; a heat transfer tube 4 which is arranged in the reactor vessel 2 and comes into contact with the first coolant 3; and a second coolant 5 which is supplied from the outside of the reactor vessel 2 to the heat transfer tube 4, cools the first coolant 3 and led to the outside of the reactor vessel 2. The first coolant 3 is a primary coolant, and the second coolant 5 is a fluid of the water/steam system 23 (which will be referred to as a fluid 5 hereinafter in this embodiment) which is supplied from the outside of the reactor vessel 2 to the heat transfer tube 4, cools the primary coolant 3 and led to the outside of the reactor vessel 2.

As the primary coolant 3, there is used a liquid metal coolant, a liquid such as light water or heavy water, or a gas such as a helium gas or a carbon dioxide. Although a lead-bismuth eutectic having a liquid phase, which does not cause an intensive reaction even if it comes into contact with the fluid 6 of the water/steam system 23, is used as the primary coolant 3 in this embodiment, the present invention is not restricted thereto, and liquid metal such as liquid potassium may be adopted. Incidentally, when the water/steam system 23 is used as a secondary coolant system, a use of liquid sodium, which intensively reacts with water, as the primary coolant 3 is not preferable unless a heat transfer tube structure which can assure the safety is adopted.

The first heat transfer tube 4 is arranged in the primary coolant 3 or, preferably in the vicinity of the inner wall surface of the reactor vessel 2, e.g., outside a shield 10 surrounding the reactor core 1. The heat transfer tube 4 is constituted of many tubes connected to each other by an upper header 20 and a lower header 21, and these tubes are arranged in the form of a concentric circle with the reactor vessel 2, for example. The upper header 20 of the heat transfer tube 4 is connected to an upper annular body 18 attached on an outer peripheral surface of the reactor vessel 2 and causes a flow path in the heat transfer tube 4 to communicate with a flow path in the upper annular body 18. Further, the lower header 21 of the heat transfer tube 4 is connected to a lower annular body 19 attached on the outer peripheral surface of the reactor vessel 2 and causes a flow path in the heat transfer tube 4 to communicate with a flow path in the lower annular body 19. The upper annular body 18 is connected to a steam piping 14 of the water/steam system 23. Furthermore, the lower annular body 19 is connected to a water supply tube 13 of the water/steam system 23.

The primary coolant 3 of the primary coolant system is heated by cooling the reactor core 1, and cooled by heating the fluid 5 of the water/steam system flowing through the heat transfer tube 4. Therefore, the primary coolant 3 convects in the reactor vessel 2, and transfers heat of the reactor core 1 to the fluid 5 of the water/steam system 23 through the heat transfer tube 4.

The fluid 5 of the water/steam system 23 flows into the lower header 21 of the heat transfer tube 4 from the lower annular body 19 in the state of water, is turned to steam by receiving heat from the primary coolant 3 while moving up through the heat transfer tube 4, and supplied to a power generation turbine 15 through the steam piping 15. Then, after driving the power generation turbine 15, it is again turned into water by a condenser 16, and again supplied into the heat transfer tube 4 by a pump 12.

In this manner, heat transfer from the primary coolant 3 to the fluid 5 of the water/steam system 23 is carried out by the first heat transfer tube 4 arranged in the reactor vessel 2. Therefore, in this nuclear reactor, heat transfer can be performed and steam can be generated without using a large steam generator independent from the reactor vessel, which is required in the prior art.

Moreover, in this nuclear reactor, since the steam generator is not used and the primary coolant system is integrated in the reactor vessel 2, the number of tubes and the like of the primary coolant system can be greatly reduced. Therefore, the cooling system can be simplified and reduced in size. That is, the nuclear steam supply system can be reduced in size, and a manufacturing cost can be decreased. Additionally, since the cooling system can be simplified, the maintenance management of the nuclear reactor becomes simple, and its cost can be also reduced. Further, since the small nuclear reactor can be inexpensively manufactured, a use of the nuclear reactor as a dispersion-type power source can be facilitated.

Heat transfer using the heat transfer tube is an established technique used in, e.g., a water tube boiler and others, and it is a heat transfer technique with high reliability and suitable for a use in the nuclear reactor requiring high safety.

This nuclear reactor is very suitable for an application to a small nuclear reactor, e.g., a small nuclear reactor whose electrical output is approximately 5000 kW, a small nuclear reactor whose electrical output is approximately 10000 kW and the like. In the small nuclear reactor having such a degree of electrical output, a calorific value of the reactor core 1 is relatively small, the reactor core 1 can be sufficiently cooled by a circulation based on the natural convection of the primary coolant 3, and heat transfer using the heat transfer tube 4 is sufficiently possible. However, it can be also applied to a large nuclear reactor by appropriately performing designing.

It is to be noted that the above embodiment is a preferred example according to the present invention, but the present invention is not restricted thereto, and various modifications can be carried out without departing from the scope of the invention. For example, in the respective embodiments shown in FIGS. 1 and 3, the heat transfer tubes 4 are arranged at equal intervals in the form of a concentric circle along the inner wall surface of the vessel 2 as shown in FIG. 2, but the present invention is not restricted thereto, they may be arranged in the zigzag form, or they may be closely arranged without gaps so as to constitute a tube wall in some cases. Furthermore, although the heat transfer tube 4 is a straight tube erected in the perpendicular direction, it may be an inclined tube or a coil-like tube according to needs.

Moreover, in the nuclear reactor shown in FIG. 1, although the secondary coolant 5 in the first heat transfer tube 4 is circulated by the natural convection generated by heating the secondary coolant 5 by using the primary coolant 3, a pump may be provided to the annular body 11 in order to forcibly circulate the secondary coolant 5 in some cases. A flow quantity of the secondary coolant 5 is increased by circulating the secondary coolant 5 by using the pump, and heat transfer from the primary coolant 3 to the water/steam system can be further excellently performed. Further, a force F to facilitate the convection of the primary coolant 3 formed by magnetic flux generating means 17 is increased when a flow quantity of the secondary coolant 5 is increased, and a circulation quantity of the primary coolant 3 is also increased. Therefore, heat transfer from the primary coolant system to the secondary coolant system can be excellently performed.

Furthermore, although the magnetic flux generating means 17 of the nuclear reactor shown in FIG. 1 is constituted by a pair of cylindrical permanent magnets 17a and 17b, the present invention is not restricted to a pair of cylindrical permanent magnets 17a and 17b as long as the means can generate a magnetic flux which pierces the first heat transfer tubes 4 in the radial direction of the double vessel 6. In short, it is possible to carry out the means as long as the means generates a radial magnetic flux which pierces the secondary coolant 5 moving up in the first heat transfer tube 4 and the primary coolant 3 moving down around the secondary coolant 5.

Moreover, the primary coolant 3 and the secondary coolant 5 in the nuclear reactor shown in FIG. 1 are not restricted to a conductor such as liquid metal, and liquid such as light water or heavy water other than the conductor can be adopted, and gas such as a helium gas or a carbon dioxide may be used. In this case, since a magnetic relationship cannot be provided between the primary coolant 3 and the secondary coolant 5, a structure in which the magnetic flux generating means 17 is eliminated is employed.

Additionally, although the second heat transfer tube 8 has a coil-like shape in the nuclear reactor shown in FIG. 1, it is needless to say that the present invention is not restricted thereto.

What is claimed is:
1. A nuclear reactor comprising:
   a double vessel accommodating a reactor core therein, the double vessel including a reactor vessel as an inner vessel of the double vessel, and an outer vessel of the double vessel which is outward of the reactor vessel;
   a primary coolant stored in the reactor vessel and adapted to be heated by the reactor core for creating convection of the primary coolant in the reactor vessel;

a first heat transfer tube in the reactor vessel and in contact with the primary coolant;

a secondary coolant stored between the outer vessel and the reactor vessel of the double vessel with first means for supplying the secondary coolant from outside the reactor vessel to the first heat transfer tube for cooling the primary coolant and for leading the secondary coolant to the outside the reactor vessel;

a second heat transfer tube between the outer vessel and the reactor vessel of the double vessel and in contact with the secondary coolant; and a tertiary coolant with second means for supplying the tertiary coolant from outside the double vessel to the second heat transfer tube for cooling the secondary coolant and for leading the tertiary coolant to the outside of the double vessel; and wherein the first heat transfer tube is arranged on an inner surface of the reactor vessel and is connected to an upper header and to a lower header, the upper and lower headers being open to the outside of the reactor vessel, and the primary coolant and the secondary coolant being liquid metal.

2. The nuclear reactor according to claim 1, further comprising magnetic flux generating means for generating a magnetic flux which pierces the first heat transfer tube in a radical direction of the double vessel, and an electromotive force generated by a flow of the secondary coolant in the first heat transfer tube is used to produce a force to facilitate covection of the primary coolant.

3. The nuclear reactor according to claim 1, further comprising a water/steam system, the tertiary coolant being a fluid of the water/steam system.

4. The nuclear reactor according to claim 1, wherein the primary coolant and the secondary coolant are liquid sodium.

5. The nuclear reactor according to claim 2, wherein the first heat transfer tube is an erected straight tube.

* * * * *